(12) United States Patent
Hashberger et al.

(10) Patent No.: US 8,665,119 B2
(45) Date of Patent: Mar. 4, 2014

(54) ELECTRICALLY ACTIVATED LATCH FOR AIRCRAFT STOWAGE BINS

(75) Inventors: Frank E. Hashberger, Snohomish, WA (US); Clarence Ivester, Arlington, WA (US)

(73) Assignee: BE Intellectual Property, Inc., Wellington, FL (US)

( * ) Notice: Subject to any disclaimer, the term of this patent is extended or adjusted under 35 U.S.C. 154(b) by 323 days.

(21) Appl. No.: 13/089,187

(22) Filed: Apr. 18, 2011

(65) Prior Publication Data

US 2011/0254705 A1 Oct. 20, 2011

Related U.S. Application Data

(60) Provisional application No. 61/326,158, filed on Apr. 20, 2010.

(51) Int. Cl.
*G08B 21/00* (2006.01)

(52) U.S. Cl.
USPC ............. 340/945; 340/815.4; 244/118.1; 244/118.5; 244/117 R; 361/837; 361/679.4

(58) Field of Classification Search
USPC ............. 340/945, 815.4–815.92; 361/837; 361/679.4; 244/117 R, 118.1, 118.5
See application file for complete search history.

(56) References Cited

U.S. PATENT DOCUMENTS

| | | | |
|---|---|---|---|
| 4,637,642 A | 1/1987 | Stoecker | |
| 7,143,977 B2 | 12/2006 | Graf et al. | |
| 2004/0046084 A1* | 3/2004 | Brzeski et al. | 244/129.5 |
| 2008/0055836 A1* | 3/2008 | Lamoree et al. | 361/683 |
| 2008/0073462 A1 | 3/2008 | Wolf | |
| 2008/0078871 A1 | 4/2008 | Munson et al. | |
| 2008/0295407 A1* | 12/2008 | Von Wieding et al. | 49/199 |

OTHER PUBLICATIONS

EPO, International Search Report and Written Opinion in Application No. PCT/US2011/033110 dated Sep. 15, 2011.

* cited by examiner

*Primary Examiner* — Brian Zimmerman
*Assistant Examiner* — Laura Nguyen
(74) *Attorney, Agent, or Firm* — Fulwider Patton LLP

(57) ABSTRACT

An electrically activated latch for aircraft stowage bins includes an overhead stowage bin module having a stationary support structure and a movable stowage bin portion. An electrically operated stowage bin latch mechanism latches the movable stowage bin portion in a closed position and unlatches the movable stowage bin portion to an open position. An electrically operated stowage bin activation switch operates the stowage bin latch mechanism, allowing the aircraft stowage bins to be locked by independently controlling the overhead stowage bins through the aircraft cabin management system, or by control of the latch by the stowage bin activation switch.

14 Claims, 4 Drawing Sheets

ELECTRICALLY ACTIVATED LATCH FOR AIRCRAFT STOWAGE BINS

CROSS-REFERENCES TO RELATED APPLICATIONS

This application is based upon and claims priority from Provisional Patent Application No. 61/326,158, filed Apr. 20, 2010, which is incorporated by reference in its entirety herein.

BACKGROUND OF THE INVENTION

The present invention relates generally to overhead luggage bins for aircraft, and more particularly relates to an electrically activated latch system for aircraft overhead luggage bins that can be electrically latched closed or opened by a latch touch pad, or by a control unit.

The contents contained within overhead stowage bins in aircraft are currently secured by means of a mechanical latch system that consists of a handle mechanism which is physically connected to a latch mechanism. Existing aircraft overhead stowage bin designs rely on purely mechanical latching systems of various means.

It would be desirable to provide an electrically activated stowage bin latch system to promote safety by allowing aircraft stowage bins to be locked during periods of aircraft operation when passengers should remain seated. It would be desirable to accomplish this by independently controlling the overhead stowage bins through an aircraft cabin management system, or by linking the control of the latch to fasten seat belt sign controls, for example. It would also be desirable to provide a stowage bin activation switch that can serve as a passenger interface having the ability to provide latch status information, as well as the ability to provide lighting for emergency illumination. It would also be desirable for the emergency lighting function to be available for any aircraft having stowage bins mounted such that the stowage bin activation switch can be aligned in a manner that would illuminate one or more aircraft aisles. The present invention meets these and other needs.

SUMMARY OF THE INVENTION

Briefly, and in general terms, the present invention provides for an overhead stowage bin module electronic latching system for an aircraft, including an overhead stowage bin module having a stationary support structure and a movable stowage bin portion, an electrically operated stowage bin latch mechanism configured to latch and unlatch the movable stowage bin portion in a closed position and unlatch the movable stowage bin portion to be released to an open position, and an electrically operated stowage bin activation switch configured operate the stowage bin latch mechanism, allowing the aircraft stowage bins to be locked by independently controlling the overhead stowage bins through an aircraft cabin management system, or by control of the latch by the stowage bin activation switch.

Accordingly, the present invention provides for an aircraft overhead stowage bin module electronic latching system including an overhead stowage bin module having a stationary support structure and a movable stowage bin portion cooperatively connected to the stationary support structure for movement in relation to the stationary support structure. The movable stowage bin portion is movable between an open position and a closed position, and forms an enclosure with the stationary support structure for stowage of items in the closed position. A stowage bin latch mechanism is provided that is configured to latch the movable stowage bin portion in the closed position and unlatch the movable stowage bin portion to be released to the open position. A stowage bin activation switch is configured operate the stowage bin latch mechanism. In one presently preferred aspect, the movable stowage bin portion is configured to move downward to the open position, and upward to the closed position, with respect to the stationary support structure. In another presently preferred aspect, the movable stowage bin portion is pivotally mounted for reciprocating rotating movement downward and upward with respect to the stationary support structure between the open and closed positions. The stowage bin latch mechanism typically includes a latch housing, a latch cover connected to the latch housing, a latch catch mounted to the latch housing, a main spring connected between the latch housing and the latch catch, a latch trigger connected to the latch housing, a solenoid, and a solenoid return spring connected between the solenoid and the latch trigger.

The overhead stowage bin module electronic latching system includes an electrical connection configured to receive electrical power from an aircraft electrical system, and the stowage bin activation switch is configured to receive the electrical power from the electrical connection for operation of the stowage bin latch mechanism. In a presently preferred aspect, the electrical connection is also configured to receive a fasten seat belt status signal transmitted to the stowage bin activation switch, such as from an aircraft cabin management system, for example. The electrical power and the fasten seat belt status signal are preferably conducted through wiring integrated into the overhead stowage bin module. In another presently preferred aspect, the electrical power and the fasten seat belt status signal can be conducted through one or both of a closed position contact point and an open position contact, so that when the movable stowage bin portion is in the closed position, the fasten seat belt status signal and electrical power are routed to the stowage bin activation switch through a closed position contact point, and when the movable stowage bin portion is in the open position, electrical power and a status of the position bin as closed or open is given through the closed position contact point.

In another presently preferred aspect, the stowage bin activation switch includes a touch pad switch having a lens and a lighting system adjacent to the lens, and the lighting system is configured to provide cabin emergency illumination, such as during a loss of aircraft power, or in response to a command signal to provide emergency illumination, for example. In another presently preferred aspect, the stowage bin activation switch comprises a capacitive touch switch as a passenger interface, and the passenger interface can be illuminated to indicate the bin status, and to display other information. In another presently preferred aspect, when a fasten seat belt sign is powered, the stowage bin activation switch may be blocked from operation, and the passenger interface is configured to indicate a locked status.

The electrically activated latch system may be used on a variety of types of stowage bins. It also has the potential to be retrofitted onto any existing pivot or translating stowage bin design. The electrically activated latch system allows flexibility in the design geometry of the stowage compartments by eliminating a direct mechanical linkage between the activation mechanism, such as a handle or switch for example, and the latch, which allows the activation mechanism to be located with improved ergonomics compared to ergonomics of current purely mechanical systems.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
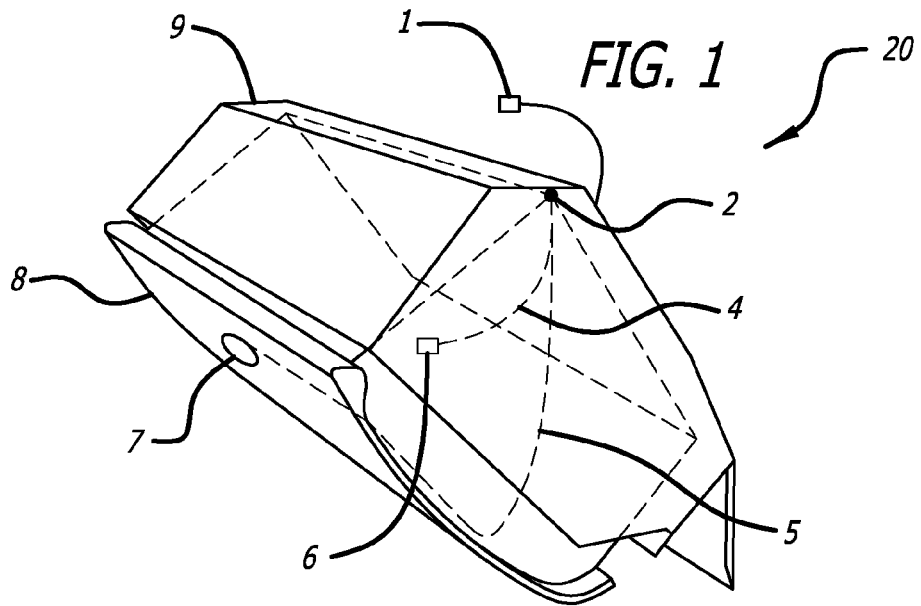
FIG. 1 is a perspective view of an overhead stowage bin module according to the present invention in a closed position.
Figure 2:
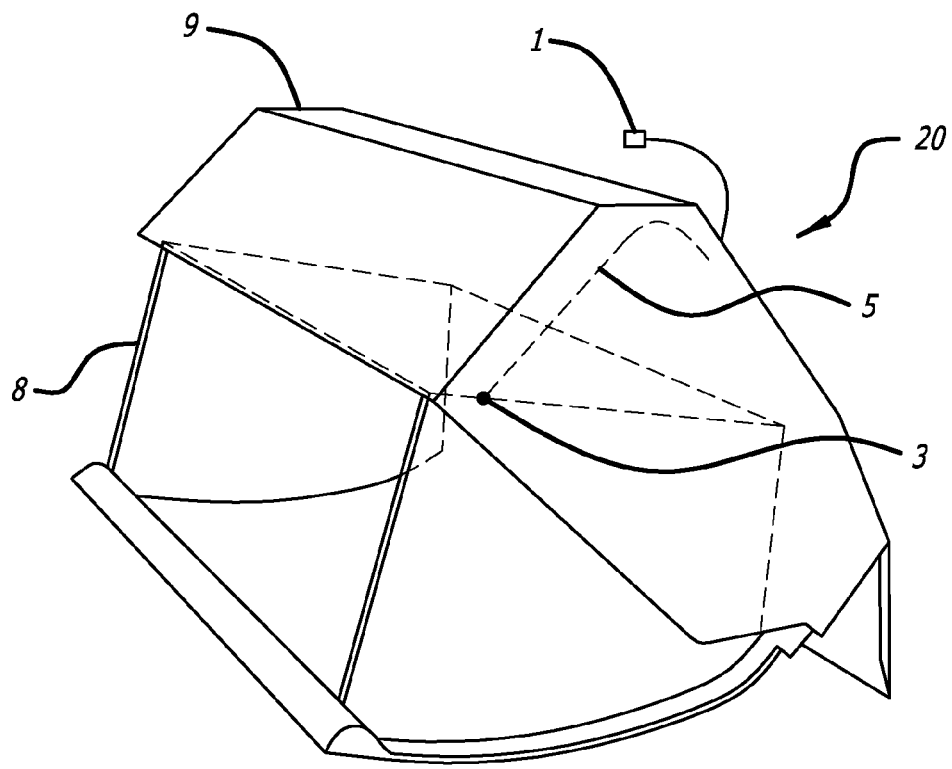
FIG. 2 is a perspective view of the overhead stowage bin module of FIG. 1 in an open position.
Figure 6:
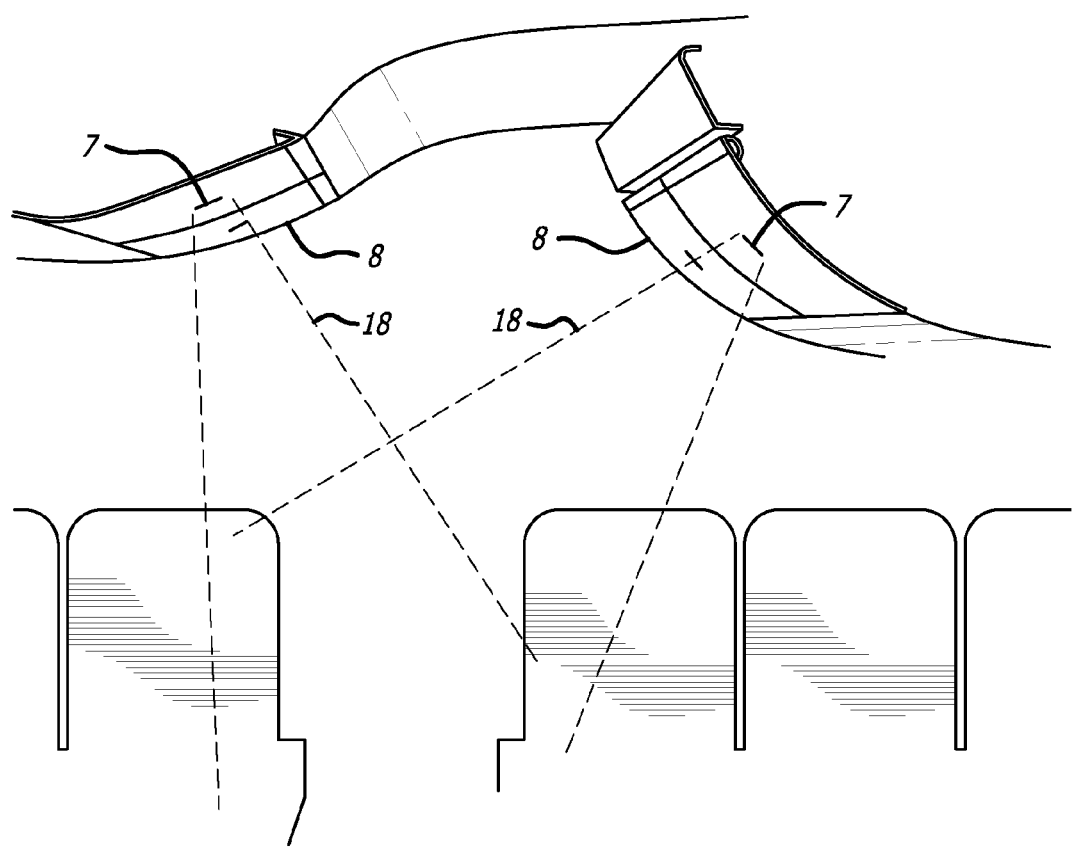
FIG. 6 is a schematic diagram of the stowage bin activation switch touch pad functioning to provide cabin emergency illumination.

Referring to the drawings, which are provided by way of example, and not by way of limitation, the present invention provides for an aircraft overhead stowage bin module electronic latching system including an overhead stowage bin module 20, which is illustrated in FIGS. 1, 2 and 6. The electrically activated latch system is contained within the aircraft overhead stowage bin module, which is made up of a support structure 9, a movable stowage bin portion 8, and a connection 1 to the aircraft electrical system, which provides power and transmits a fasten seat belt sign (FSB) status signal in the passenger service units. The movable stowage bin portion 8 can be of the type which moves between downward and upward positions through the use of a translating linkage mechanism, or rotates between downward and upward positions by using a pivot mechanism, for example, as illustrated in FIGS. 1 and 2. Power and the fasten seat belt sign (FSB) status signal are transmitted to the stowage bin activation switch 7 through contact points 2 and 3 via electrical wiring 4, 5. When the movable stowage bin portion is in the closed position, the fasten seat belt sign (FSB) status signal and power are routed to the activation switch 7 through contact point 2. If the fasten seat belt sign is powered so as to be illuminated, resulting in transmission of the fasten seat belt sign (FSB) status signal, the activation switch may be blocked from operation, and indicate a locked status through illumination of the face of the activation switch. Referring to FIG. 2, when the bin is in the open position, power and the status of the bin are provided through contact point 2, if required for additional features of the stowage bin portion.

Figure 3:
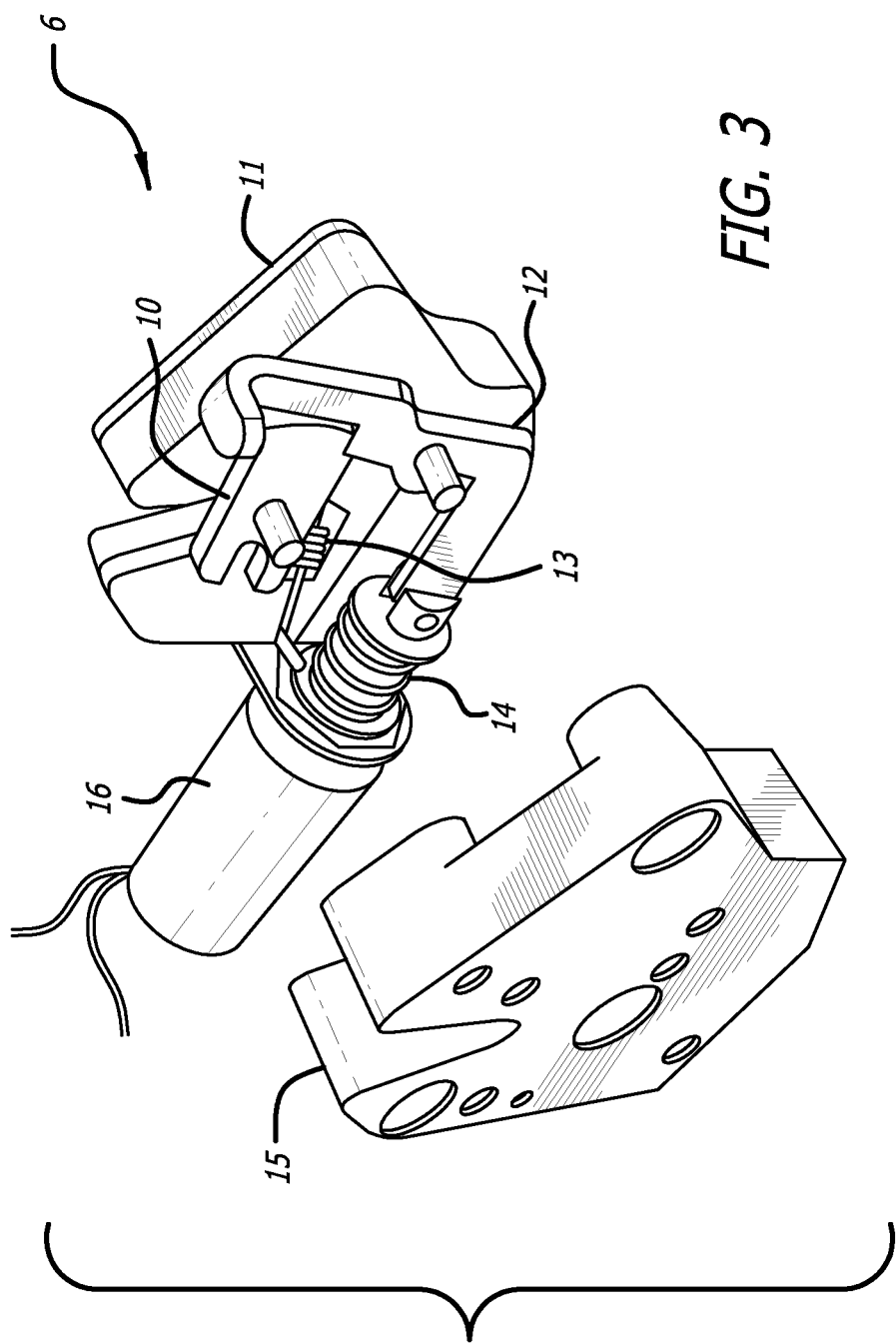
FIG. 3 is a perspective exploded view of the stowage bin latch mechanism of the overhead stowage bin module of FIG. 1.

As is illustrated in FIG. 3, the latch portion of the stowage bin latch mechanism 6 consists of a latch housing 11, a latch cover 15, a latch catch 10, a main spring 13, a latch trigger 12, a solenoid return spring 14, and a solenoid 16.

Figure 4:
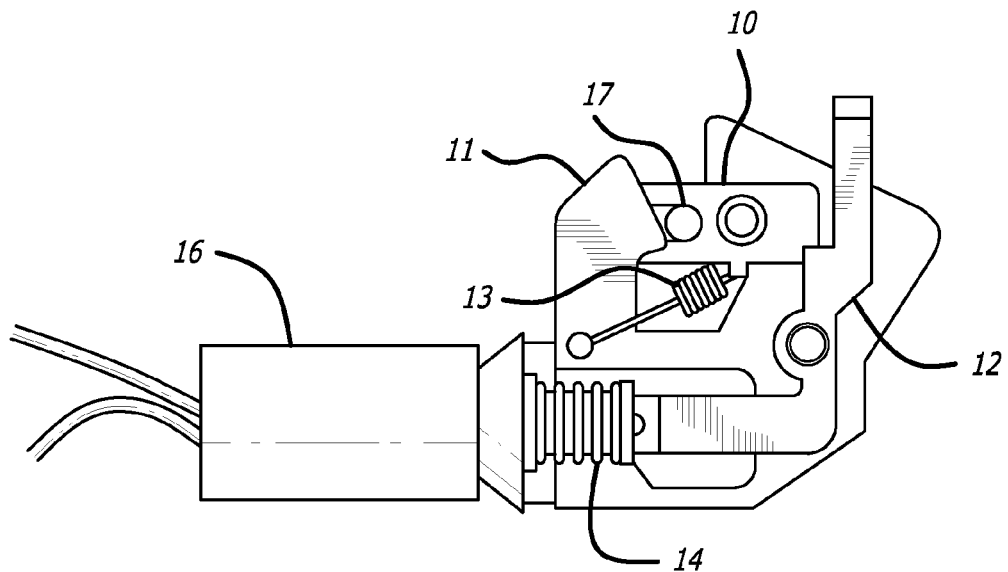
FIG. 4 is a side elevational view of the stowage bin latch mechanism of FIG. 3 showing the latch mechanism engaged.

Referring to FIG. 4, the latch mechanism 6 engages a latch pin 17 with the latch catch 10. The latch catch 10 is locked into position by the latch trigger 12, which is spring loaded closed by the solenoid return spring 14. The latch trigger is engaged by the return spring 14 any time the latch catch 10 is rotated closed by contacting the latch pin 17 during closure of the stowage bin portion.

Figure 5:
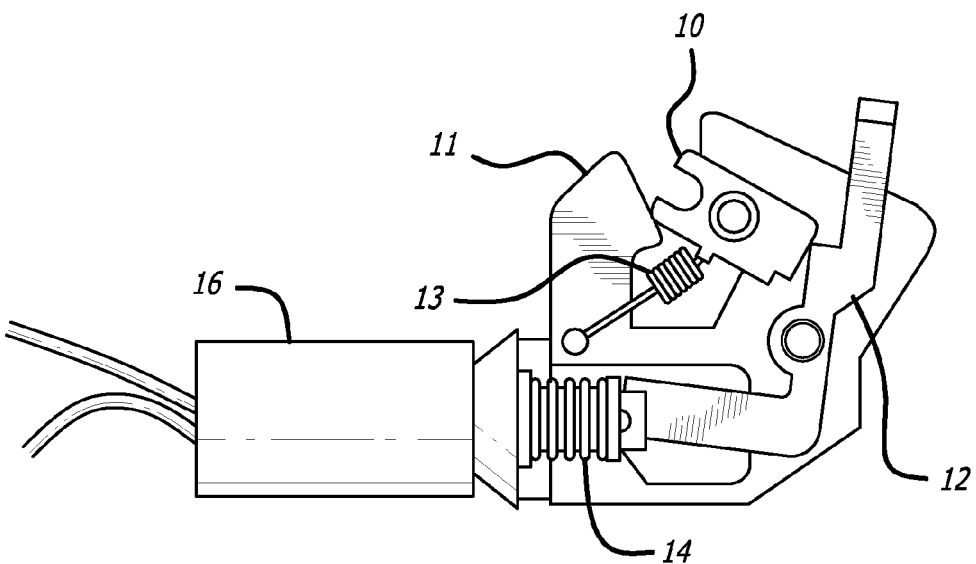
FIG. 5 is a side elevational view of the stowage bin latch mechanism of FIG. 3 showing the latch mechanism disengaged.

The activation switch 7 on the face of the movable stowage bin portion 8 is energized when the bin is closed (and if required, the fasten seat belt sign is off). Activating the switch energizes the solenoid 16 pulling the trigger 12 (or pushing if the solenoid is located opposite the shown position). The trigger 12 disengages the catch, and the catch is opened by the main spring 13, as is illustrated in FIG. 5. The trigger may also be activated manually by depressing the manual override lever which protrudes form the latch mechanism.

The mechanism may be configured in many variations. The solenoid may be a pull action, or push. The trigger is loaded closed by the solenoid return spring, acting to lock closed the catch, which is loaded open by the main spring. Activating the solenoid will rotate the trigger to unlock the catch, which will be spring open, releasing the latch pin, allowing the overhead luggage bin compartment to open. The status of the movable stowage bin portion (open or closed) is determined by contacts at the ends of the bin travel. No communication with a aircraft cabin management system is required to make the latch system function. However, it is possible to incorporate features in the aircraft overhead stowage bin module electronic latching system, such as a lockout function, during times when the fasten seat belt (FSB) sign is illuminated, for example.

Referring to FIG. 6, upon sensing a loss of aircraft power, or receiving a command to provide emergency illumination 18, an LED lighting system behind the lens of the touch pad can illuminate, and provide lighting for an emergency evacuation path in one or more aisles of the aircraft.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. An overhead stowage bin module electronic latching system for an aircraft, comprising:

an overhead stowage bin module including a stationary support structure and a movable stowage bin portion cooperatively connected to the stationary support structure for movement in relation to said stationary support structure, said movable stowage bin portion being movable between an open position and a closed position, and said movable stowage bin portion forming an enclosure with said stationary support structure for stowage of items in said closed position;

a stowage bin latch mechanism connected to said overhead stowage bin module and configured to latch said movable stowage bin portion in the closed position and to unlatch said movable stowage bin portion to be released to said open position; and a stowage bin activation switch connected to said stowage bin latch mechanism and configured operate the stowage bin latch mechanism, wherein the aircraft includes an aircraft electrical system, electrical wiring connected to the aircraft electrical system and said stowage bin activation switch, said electrical wiring being configured to receive electrical power from an aircraft electrical system, and wherein said stowage bin activation switch is configured to receive the electrical power from the aircraft electrical system via the electrical wiring for operation of the stowage bin latch mechanism, wherein said electrical wiring is configured to transmit a fasten seat belt status signal to said stowage bin activation switch, and wherein said electrical power and said fasten seat belt status signal are conducted through said electrical wiring through a closed position contact point and an open position contact point to the stowage bin activation switch, wherein the closed position contact point corresponds to a first electrical wiring circuit for transmitting power, and wherein the open position contact point corresponds to a second electrical wiring circuit for transmitting power, separate from the first electrical wiring circuit.

2. The overhead stowage bin module electronic latching system of claim 1, wherein said movable stowage bin portion is configured to move downward and upward with respect to said stationary support structure.

3. The overhead stowage bin module electronic latching system of claim 1, wherein said movable stowage bin portion is pivotally mounted for reciprocating rotating movement downward and upward with respect to said stationary support structure.

4. The overhead stowage bin module electronic latching system of claim 1, wherein said electrical wiring is integrated into said overhead stowage bin module.

5. The overhead stowage bin module electronic latching system of claim 1, wherein said stowage bin activation switch comprises a touch pad switch including a lens and a lighting system adjacent to the lens, the lighting system being configured to provide cabin emergency illumination during a loss of aircraft power, or in response to a command to provide emergency illumination.

6. The overhead stowage bin module electronic latching system of claim 1, wherein said stowage bin activation switch comprises a capacitive touch switch passenger interface.

7. The overhead stowage bin module electronic latching system of claim 6, wherein said passenger interface is configured to be illuminated to indicate the bin status.

8. The overhead stowage bin module electronic latching system of claim 6, wherein said passenger interface is configured to display information.

9. The overhead stowage bin module electronic latching system of claim 6, wherein the aircraft includes a fasten seat belt sign that can be powered, and said fasten seat belt sign is operatively connected to said stowage bin activation switch and said passenger interface, such that when said fasten seat belt sign is powered, the stowage bin activation switch is blocked from operation, and said passenger interface is configured to indicate a locked status.

10. The overhead stowage bin module electronic latching system of claim 1, wherein said stowage bin latch mechanism comprises a latch housing, a latch cover connected to the latch housing, a latch catch mounted to the latch housing, a main spring connected between the latch housing and the latch catch, a latch trigger connected to the latch housing, a solenoid mounted to the latch housing, and a solenoid return spring connected between the solenoid and the latch trigger.

11. An overhead stowage bin module electronic latching system for an aircraft having an aircraft electrical system, comprising:

an overhead stowage bin module including a stationary support structure and a movable stowage bin portion cooperatively connected to the stationary support structure for movement in relation to said stationary support structure, said movable stowage bin portion being movable downward and upward with respect to said stationary support structure between an open position and a closed position, and said movable stowage bin portion forming an enclosure with said stationary support structure for stowage of items in said closed position;

a stowage bin latch mechanism connected to said overhead stowage bin module and configured to latch said movable stowage bin portion in the closed position and to unlatch said movable stowage bin portion to be released to said open position;

a stowage bin activation switch connected to said stowage bin latch mechanism and configured operate the stowage bin latch mechanism; and electrical wiring connected to the aircraft electrical system and said stowage bin activation switch and configured to receive electrical power from the aircraft electrical system, and wherein said stowage bin activation switch is configured to receive the electrical power via the electrical wiring from the aircraft electrical system for operation of the stowage bin latch mechanism, wherein said electrical wiring is configured to transmit a fasten seat belt status signal to said stowage bin activation switch, and wherein said electrical power and said fasten seat belt status signal are conducted through said electrical wiring through a closed position contact point and an open position contact point to the stowage bin activation switch, and wherein the closed position contact point corresponds to a first electrical wiring circuit for transmitting power, and wherein the open position contact point corresponds to a second electrical wiring circuit for transmitting power, separate from the first electrical wiring circuit, wherein said stowage bin activation switch comprises a touch pad switch including a lens and a lighting system adjacent to the lens, the lighting system being configured to provide cabin emergency illumination during a loss of aircraft power, or in response to a command to provide emergency illumination.

12. The overhead stowage bin module electronic latching system of claim 11, wherein said electrical wiring is integrated into said overhead stowage bin module.

13. The overhead stowage bin module electronic latching system of claim 11, wherein said stowage bin activation switch comprises a capacitive touch switch passenger interface.

14. The overhead stowage bin module electronic latching system of claim 13, wherein the aircraft includes a fasten seat belt sign that can be powered, and said fasten seat belt sign is operatively connected to said stowage bin activation switch and said passenger interface, such that when said fasten seat belt sign is powered, the stowage bin activation switch is blocked from operation, and said passenger interface is configured to indicate a locked status.

* * * * *